(12) United States Patent
Terada et al.

(10) Patent No.: US 6,180,898 B1
(45) Date of Patent: Jan. 30, 2001

(54) EMERGENCY STOP SWITCHING MECHANISM FOR ROBOT AND TEACHING CONTROL PANEL PROVIDED WITH SAME

(75) Inventors: Akihiro Terada, Fujiyoshida; Mitsuhiro Yasumura, Minamitsuru-gun; Kenichiro Abe, Oshino-mura, all of (JP)

(73) Assignee: Fanuc Ltd., Yamanashi (JP)

( * ) Notice: Under 35 U.S.C. 154(b), the term of this patent shall be extended for 0 days.

(21) Appl. No.: 09/202,724
(22) PCT Filed: Apr. 21, 1998
(86) PCT No.: PCT/JP98/01826
§ 371 Date: Dec. 21, 1998
§ 102(e) Date: Dec. 21, 1998
(87) PCT Pub. No.: WO98/47672
PCT Pub. Date: Oct. 29, 1998

(30) Foreign Application Priority Data

Apr. 21, 1997 (JP) .................................................. 9-116066

(51) Int. Cl.⁷ .................................................. H01H 13/50
(52) U.S. Cl. .................................. 200/51 LM; 200/17 R; 200/573
(58) Field of Search ..................................... 200/6 R, 6 B, 200/17 R, 52 R, 51 LM, 402, 85 A, 505, 553, 555, 573, 574, 329, 334, 337, 86.5

(56) References Cited

U.S. PATENT DOCUMENTS 4,885,435 * 12/1989 Dix ....................................... 200/1 B
4,918,266 * 4/1990 Dalebout et al. .................. 200/52 R

FOREIGN PATENT DOCUMENTS

| 62-180828 | 11/1987 | (JP) | ................................. H01H/13/52 |
| 63-207580 | 8/1988 | (JP) | ................................. B25J/13/06 |
| 3-190688 | 8/1991 | (JP) | ................................. B25J/9/22 |
| 6-278069 | 10/1994 | (JP) | ................................. B25J/13/06 |
| 8-90485 | 4/1996 | (JP) | ................................. B25J/19/06 |
| 9-85659 | 3/1997 | (JP) | ................................. B25J/13/06 |

* cited by examiner

*Primary Examiner*—Michael Friedhofer
(74) *Attorney, Agent, or Firm*—Staas & Halsey LLP

(57) ABSTRACT

An emergency stop switch mechanism for a robot which can take an emergency position when an external operation force is released and when a strong external operation force is applied. When the robot operation is started, a main lever La is pushed down from the OFF state with a normal external operation force. Since an elastic biasing force S2 is sufficiently larger than S1, a second ancillary lever Lc is pushed by a plunger PL and is turned downward together with a first ancillary lever Lb. A movable contact element ME of a contact mechanism section CM is moved to the ON position by the second ancillary lever Lc, so that the ON state (motion permitting state) is established. If emergency stop becomes necessary, the pressure of the main lever La is released from this state, or a specially strong force is applied to the main lever La. When the former is selected, the movable contact element ME is returned to the OFF position. When the latter is selected, a strong torque is applied to an axis AX2, so that the first and second ancillary lever Lb and Lc become in a bent state. As a result, the OFF state is established, by which the robot is stopped.

10 Claims, 13 Drawing Sheets

OFF

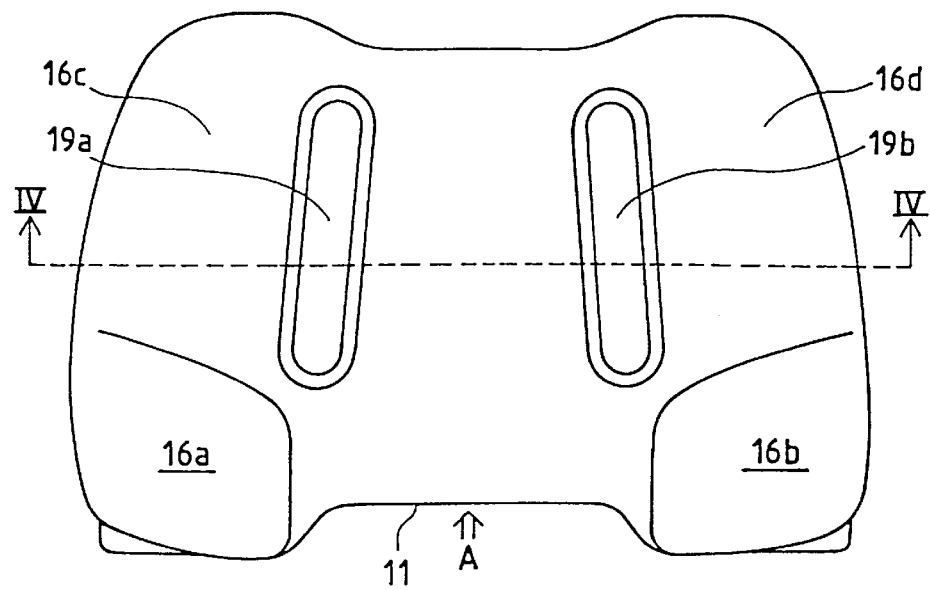
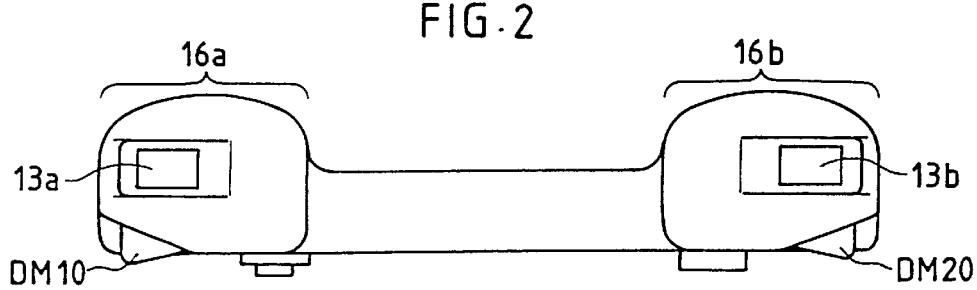
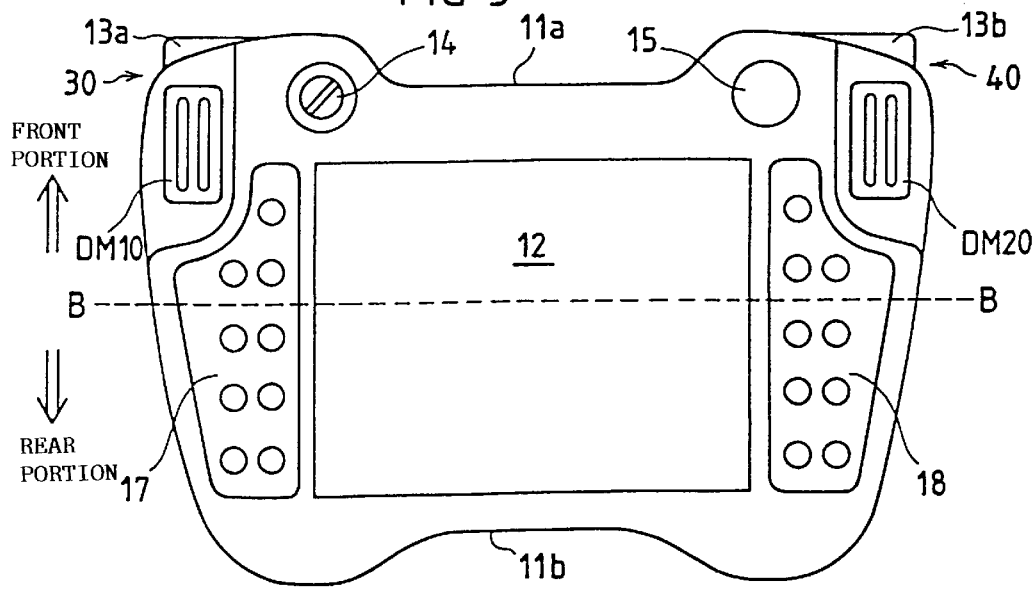

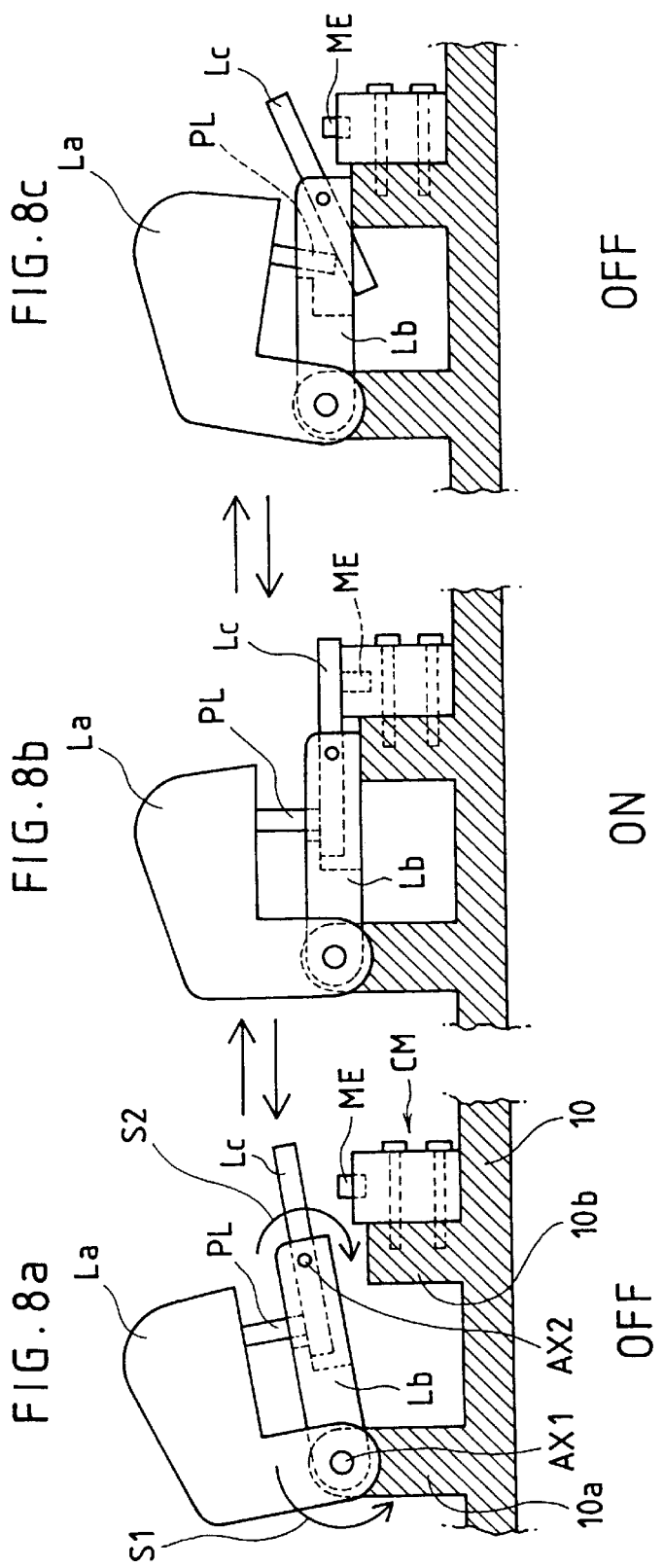

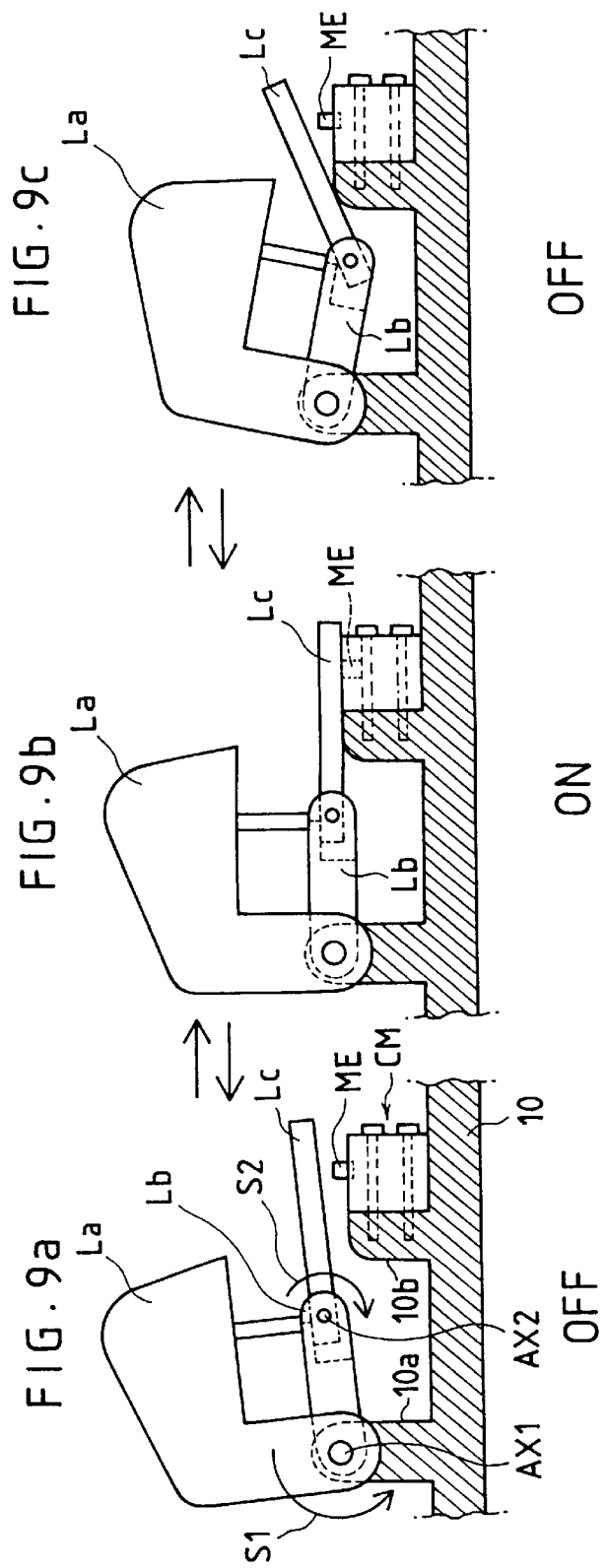

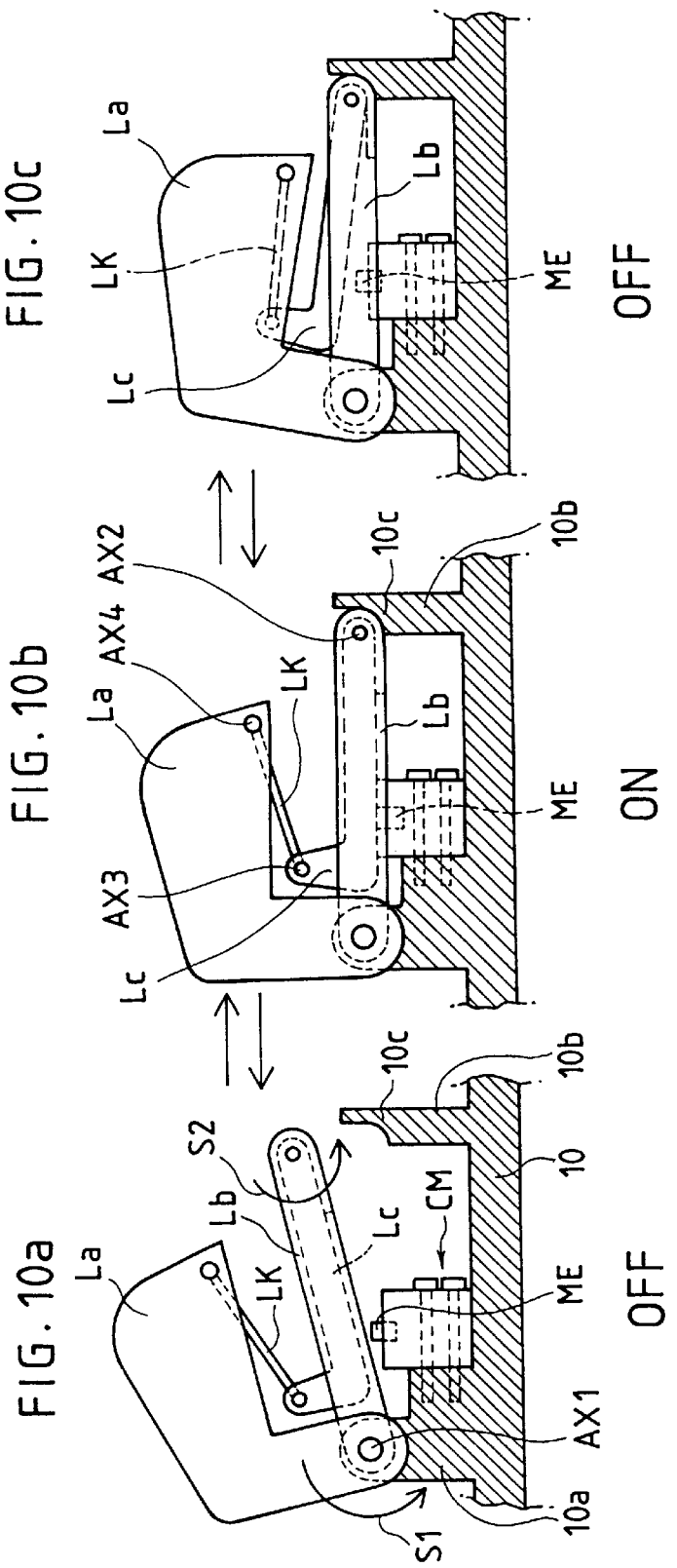

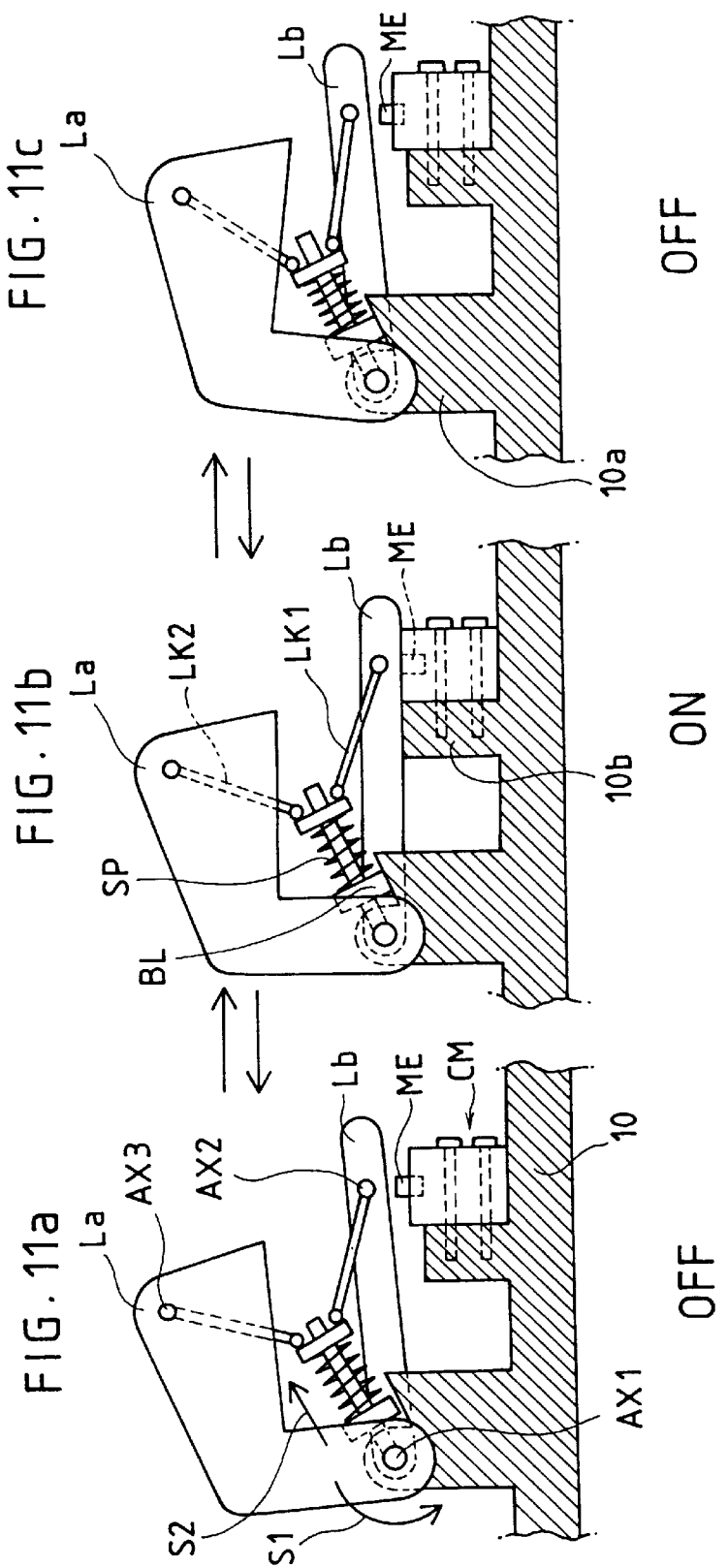

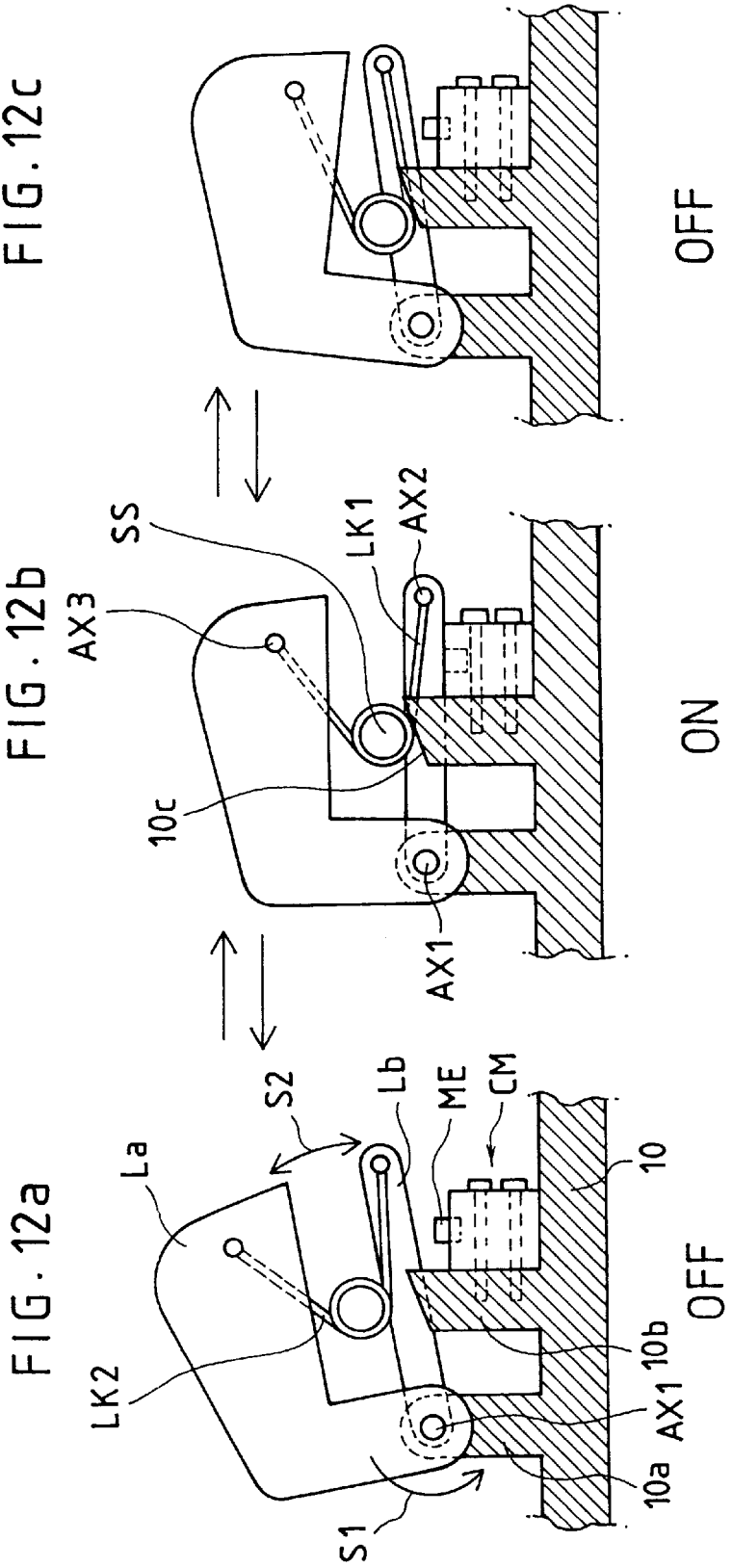

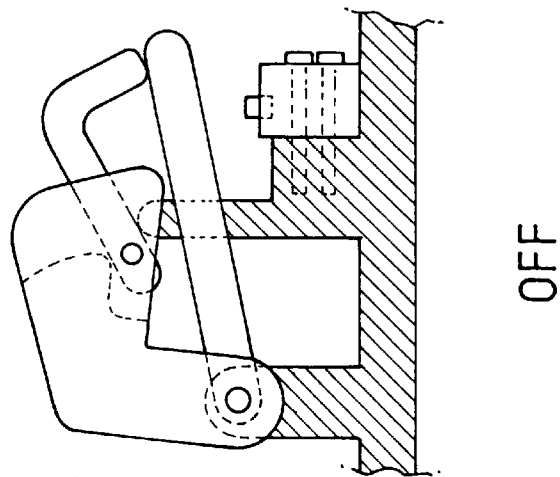
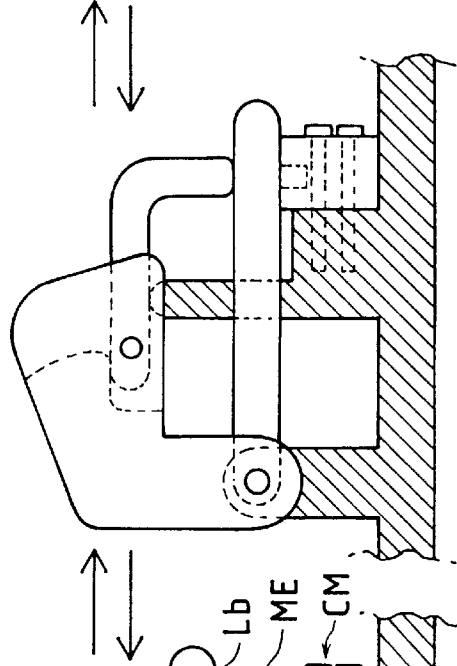
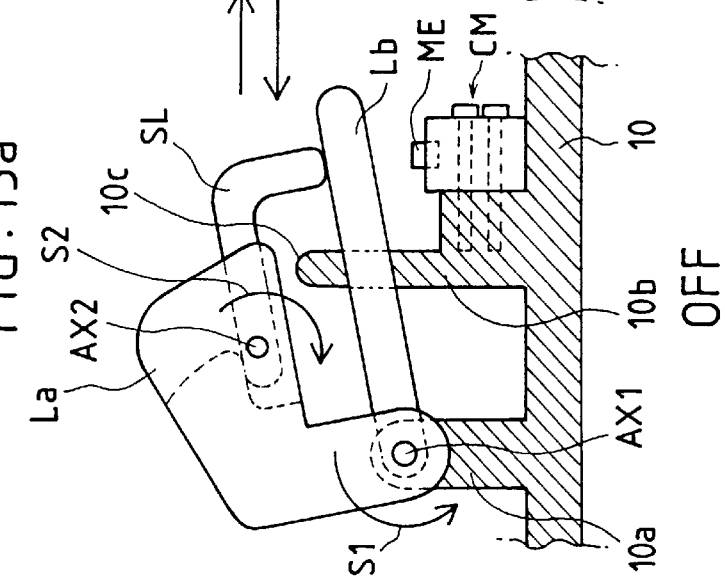

PRIOR ART

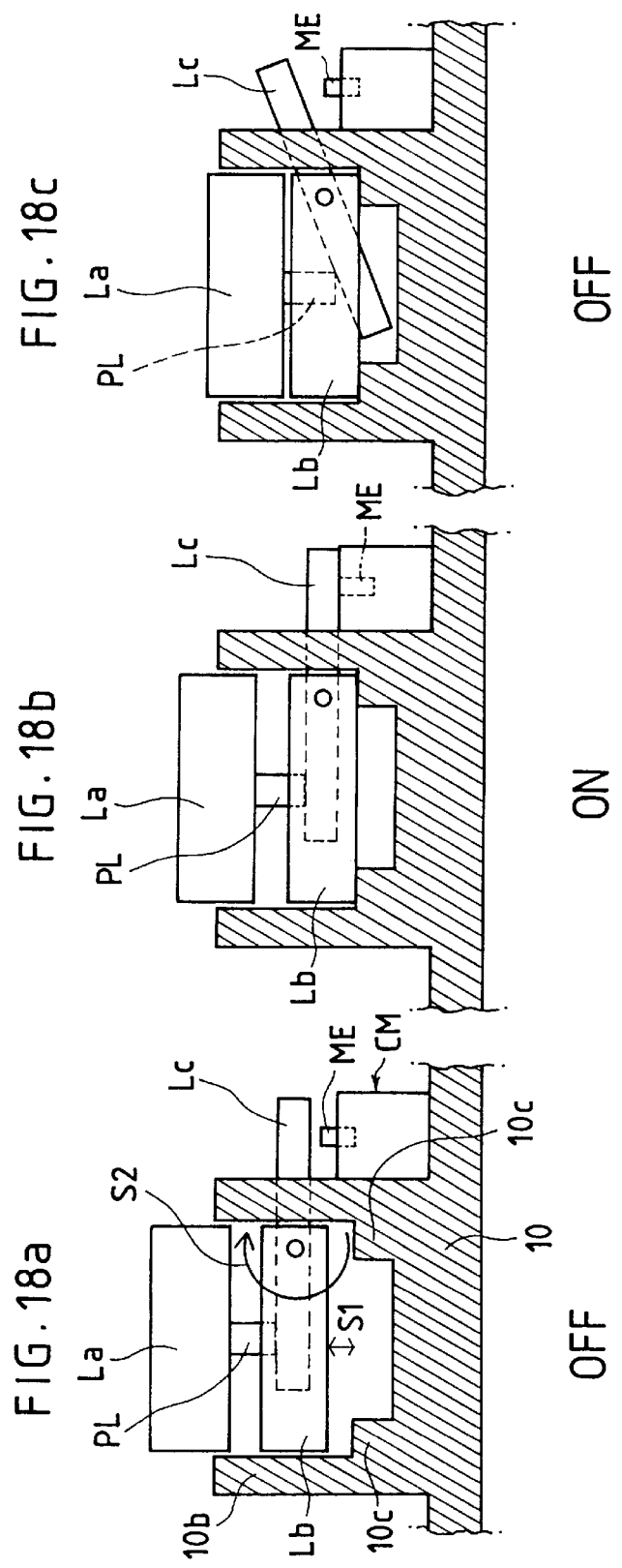

EMERGENCY STOP SWITCHING MECHANISM FOR ROBOT AND TEACHING CONTROL PANEL PROVIDED WITH SAME

TECHNICAL FIELD

The present invention relates to an emergency stop switch mechanism for a robot and a teaching operation panel with such mechanism, and more particularly to an emergency stop switch mechanism capable of taking an emergency stop position not only when an external operation force is not applied but also when a strong external operation force is applied and a teaching operation panel provided with the same mechanism.

BACKGROUND ART

As an emergency switch mechanism for stopping a robot in emergency, there is known what is called a deadman switch mechanism. Usually, the deadman switch mechanism is provided at one place or a plurality of places on a teaching operation panel connected to a robot controller. In normal operation, an operator holds the teaching operation panel and operates the robot while applying an external operation force (pressing, gripping, etc.) to an external operation force applicator (lever, button, knob, handle, etc.) of the deadman switch.

Most conventional deadman switches use a two-position type switch mechanism. Specifically, the two-position type deadman switch mechanism is an enable/disable switch mechanism having two positions of an applicator position at which the robot motion is disabled and an applicator position at which the robot motion is allowed. FIGS. 15a and 15b show an outline of a two-position type switch mechanism used for a conventional deadman switch; FIG. 15a shows a state in which an external operation force is not applied, and FIG. 15b shows a state in which an external operation force is applied.

Referring to FIGS. 15a and 15b, for the external operation force applicator of the deadman switch mechanism, a main lever L1 provided exposedly on a operation surface of a teaching operation panel and an ancillary lever L2 pushed by a plunger PL provided to the main lever L1 are pivotally supported by an axis AX1 with an elastic biasing force S1 indicated by the arrow mark.

When starting the robot operation, the operator pushes down the main lever L1 from the OFF state shown in FIG. 15a with a force overcoming the elastic biasing force S1. Accordingly, the ancillary lever L2 is pushed down and a movable contact element ME provided on a contact mechanism section CM is moved to the ON position, so that the ON state shown in FIG. 15b is established. In this ON state, the robot motion is permitted. The movable contact element ME normally has the OFF position; it is biased toward the OFF position (position projecting upward) by a publicly known proper biasing mechanism (not shown) and a stopper mechanism.

If an emergency stop of robot becomes necessary during the operation of robot, the pushing pressure of the main lever L1 is released from the ON state shown in FIG. 15b. Then, the main and ancillary levers L1 and L2 are returned to a neutral position (or a position regulated by a stopper) by the elastic biasing force S1, so that the state shown in FIG. 15a is established. In this state, the robot motion is prohibited.

When the operator feels a necessity for the emergency stop of robot, he/she must stop the application of external operation force of the deadman switch mechanism by an action such that his/her finger is set free from the lever (operation external applicator) or such that his/her hold of the teaching operation panel itself is released.

However, considering the operator's psychology, such an action can not always be taken reflectively when a state of emergency is created. In particular, the action such that the operator's hold of the teaching operation panel is released is accompanied by a psychological resistance, which delays the emergency stop of robot, whereby there may be a possibility of bringing about a dangerous situation.

For this reason, in addition to the conventional two-position switch mechanism of OFF (external operation force is not applied; robot motion is prohibited) and ON (external operation force is applied; robot motion is permitted), there has been proposed a three-position switch mechanism of OFF (external operation force is not applied; robot motion is prohibited), ON (external operation force is applied; robot motion is permitted), and OFF (external operation force is applied; robot motion is prohibited) such that the robot can be stopped in emergency by pressing a switch button with an especially strong force.

However, the conventionally proposed three-position deadman switch mechanism has disadvantages that the mechanism is large and complex and that it is difficult to apply an external force so that two states, a state in which the robot motion is prohibited and a state in which the robot motion is permitted, are distinguished definitely from each other while the external operation force is applied.

DISCLOSURE OF INVENTION

An object of the present invention is to provide a three-position type emergency stop switch mechanism for a robot, which is simple in construction and is capable of clearly specifying a difference between a robot motion prohibiting state (OFF position) and a robot motion permitting state (ON position) by the strength of applied external operation force. Also, another object of the present invention is to provide a teaching operation panel for a robot, which is provided with the above emergency stop switch mechanism, to thereby improve the operability of the teaching operation panel and secure the operator's safety.

The emergency stop mechanism for a robot of the present invention comprises: switch means which takes an ON position for permitting a robot motion and an OFF position for stopping the robot motion; an operative member which acts on the switch means for switching the ON and OFF positions; an external-operation-force receiving member elastically supported with a first biasing force, for receiving an external operation force; and connecting means for elastically connecting the operative member to the external-operation-force receiving member with a second biasing force which is larger than the first biasing force.

When a normal operation force larger than the first biasing force but not larger than the second biasing force is applied to the external-operation-force receiving member, the connecting means substantially maintains the relative position of the external-operation-force receiving member and the operative member so that the external operation force acts on the switch means to be switched from the OFF position to the ON position. When a special operation force exceeding the second biasing force is applied to the external operation force receiving member, the connecting means changes the relative position of the external-operation-force receiving member and the operative member so that the external operation force does not act on the switch means to be switched from the ON position to the OFF position.

The connecting means which meets the above condition can be embodied in various modes by using various rotational members (lever, etc.), connecting members (link, etc.) and elastic members (coil spring, extension/compression spring, etc.) which are provided in association with the external-operation-force receiving member.

In any mode, the following condition is met. When the normal external operation force is applied to the external-operation-force receiving member (lever, etc.), the connecting means substantially maintains the relative position of the external-operation-force receiving member and the operative member, so that the switch means is switched from the OFF position to the ON position. When a strong external operation force exceeding the normal external operation force is applied to the external-operation-force receiving member, the relative position of the external-operation-force receiving member and the operative member is changed, so that the switch means is switched from the ON position to the OFF position.

The emergency stop switch mechanism can be arranged at an appropriate position on the teaching operation panel. In particular, the switch mechanism should preferably be provided at each of right and left portions of the teaching operation panel so as to enhance the operability and safety of the teaching operation panel.

BRIEF DESCRIPTION OF DRAWINGS

FIG. 1 is a bottom view of a teaching operation panel provided with an emergency stop switch mechanism for a robot in accordance with the present invention;

FIG. 2 is a side view of the teaching operation panel viewed in the direction of arrow A in FIG. 1;

FIG. 3 is a top view of the teaching operation panel shown in FIG. 1;

FIGS. 8a to 8c are views of an emergency stop switch mechanism for a robot in accordance with a first embodiment of the present invention; FIG. 8a shows a state in which an external operation force is not applied (OFF state), FIG. 8b shows a state in which a normal external operation force is applied (ON state), and FIG. 8c shows a state in which a special external operation force is applied (OFF state);

FIGS. 9a to 9c are views of an emergency stop switch mechanism for a robot in accordance with a second embodiment of the present invention; FIG. 9a shows a state in which an external operation force is not applied (OFF state), FIG. 9b shows a state in which a normal external operation force is applied (ON state), and FIG. 9c shows a state in which a special external operation force is applied (OFF state);

FIGS. 10a to 10c are views of an emergency stop switch mechanism for a robot in accordance with a third embodiment of the present invention; FIG. 10a shows a state in which an external operation force is not applied (OFF state), FIG. 10b shows a state in which a normal external operation force is applied (ON state), and FIG. 10c shows a state in which a special external operation force is applied (OFF state);

FIGS. 11a to 11c are views of an emergency stop switch mechanism for a robot in accordance with a fourth embodiment of the present invention; FIG. 11a shows a state in which an external operation force is not applied (OFF state), FIG. 11b shows a state in which a normal external operation force is applied (ON state), and FIG. 11c shows a state in which a special external operation force is applied (OFF state);

FIGS. 12a to 12c are views of an emergency stop switch mechanism for a robot in accordance with a fifth embodiment of the present invention; FIG. 12a shows a state in which an external operation force is not applied (OFF state), FIG. 12b shows a state in which a normal external operation force is applied (ON state), and FIG. 12c shows a state in which a special external operation force is applied (OFF state);

FIGS. 13a 13c are views of an emergency stop switch mechanism for a robot in accordance with a sixth embodiment of the present invention; FIG. 13a shows a state in which an external operation force is not applied (OFF state), FIG. 13b shows a state in which a normal external operation force is applied (ON state), and FIG. 13c shows a state in which a special external operation force is applied (OFF state);

FIG. 15 is a view showing an outline of a two-position type switch mechanism used for a conventional deadman switch.

FIG. 16a is a side sectional view thereof and FIG. 16b is a sectional view taken along the line XVI—XVI of FIG.16a;

FIGS. 18a to 18c are views showing an outline of a mechanism in which a pushbutton is used as a working member by modifying the first embodiment; FIG. 18a shows a state in which an external operation force is not applied (OFF state), FIG. 18b shows a state in which a normal external operation force is applied (ON state), and FIG. 18c shows a state in which a special external operation force is applied (OFF state).

BEST MODE OF CARRYING OUT THE INVENTION

Figure 4:
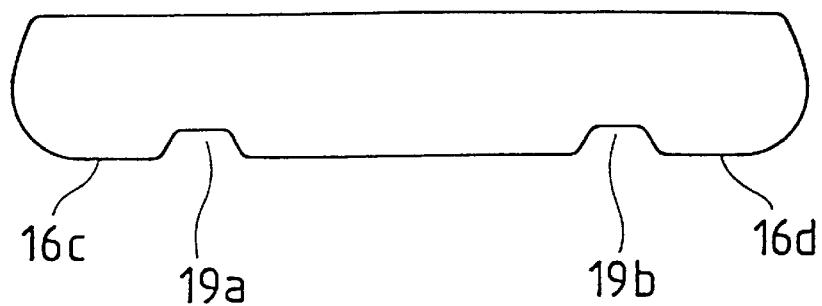
FIG. 4 is a contour view of a cross section taken along the broken line IV—IV of FIG. 1.

An emergency stop switch mechanism for a robot is usually incorporated in a teaching operation panel. Before the description of several embodiments of the emergency stop switch mechanism for a robot according to the present invention, the schematic arrangement and function of the teaching operation panel capable of incorporating the emergency stop switch mechanism for a robot in accordance with the present invention will be explained exemplarily with reference to FIGS. 1 to 7. It is to be noted that the teaching operation panel explained herein is one example, and it is a matter of course that the present invention can be carried out in the form of a teaching operation panel by applying the emergency stop switch mechanism for a robot in accordance with the present invention to a deadman switch mechanism portion of a conventional teaching operation panel.

First, the teaching operation panel to which the emergency stop switch mechanism of the present invention can be applied will be described with reference to FIGS. 1 to 5.

Referring now to FIG. 3, the broken line B—B is indicated so as to halve a teaching operation panel body 10. Here, with this centerline B—B being the reference, a portion relatively far from the operator's body during the operation is referred to as "a front portion", and the edge 11a thereof is referred to as "a front edge". Similarly, with this centerline B—B being the reference, a portion relatively close to the operator's body during the operation is referred to as "a rear portion", and the edge 11b thereof is referred to as "a rear edge".

In this example, both of the front edge 11a and the rear edge 11b are designed so as to be in a concave form.

On the top of the teaching operation panel body 10, a display 12 is provided substantially at the center, and general control key sections 17 and 18 are provided on both sides thereof. Also, left and right deadman switches DM10 and DM20 are provided at the left and right edge portions of the front portion of the teaching operation panel body 10, preferably at the left and right corner portions 30 and 40 of the foremost portion as shown in the figure. In the vicinity of the left and right deadman switches DM10 and DM20, a power ON/OFF switch 14 and an emergency stop button 15 are arranged, respectively. As described in detail later, the deadman switches DM10 and DM20 constitute an emergency stop switch mechanism having the features of the present invention.

Next, as is seen by adding FIGS. 1, 2 and 4 to the reference figure, left and right operation effective switches 13a and 13b are provided at the front edge of the left and right corner portions 30 and 40 of the foremost portion. Also, at the left and right edge portions on the back surface of the teaching operation panel body 10, convex portions 16a and 16b are provided, respectively, and concave portions 19a and 19b having a shape suitable for accommodating fingers are formed on the inside of the back surface edge portions 16c and 16d continuous with the convex portions 16a and 16b, respectively.

Figure 5:
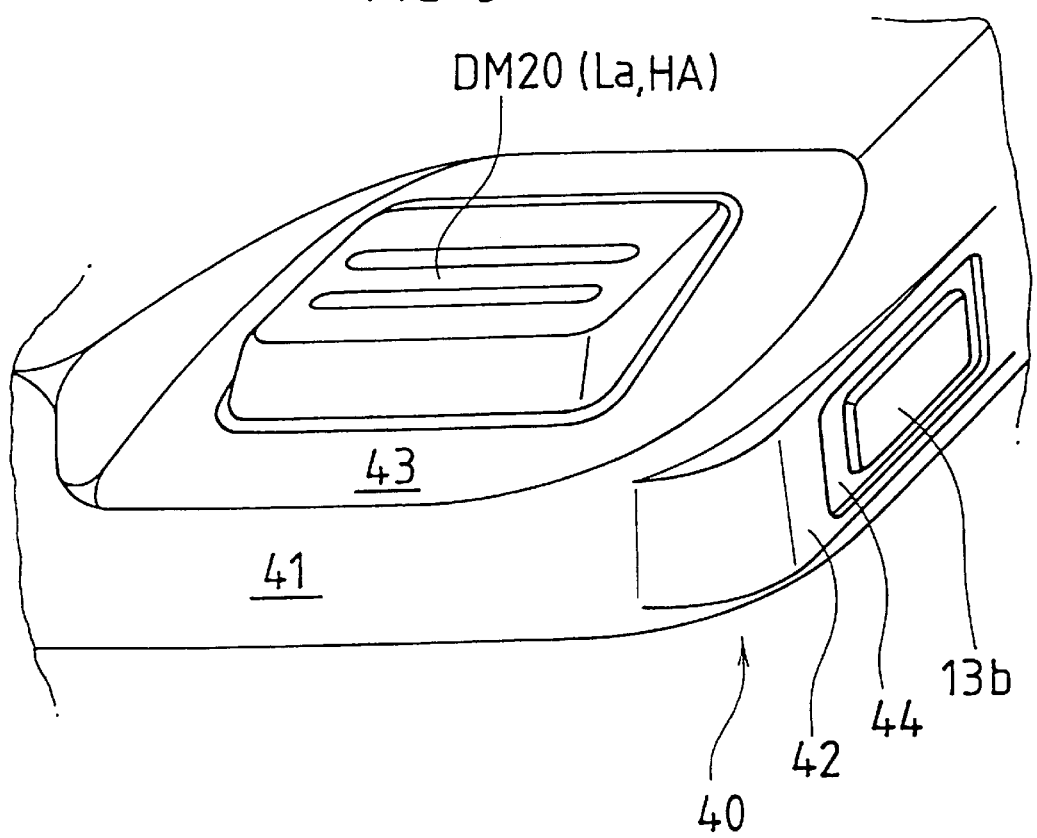
FIG 5 is a partially enlarged view showing a corner portion provided with a deadman switch and an operation effective switch of the teaching operation panel shown in FIGS. 1 to 4.

The corner portions 30 and 40 have the same construction except that they are symmetrical. The construction is shown in detail in FIG. 5, which enlargedly shows the right corner portion 40 as an example. Referring to FIG. 5, the corner portion 40 has a side edge face 41, a front edge face 42, a deadman switch installation portion 43 formed so that the side edge face 41 is cut away, and an operation effective switch installation portion 44 provided on the front edge face 42.

The deadman switch installation portion 43 is provided with the deadman switch DM20 (a main lever La is exposed), and the operation effective switch installation portion 44 is provided with the operation effective switch 13b. Thus, the deadman switch installation place and the operation effective switch installation place are close to each other. Therefore, either of the left and right deadman switches DM10 and DM20 or the operation effective switches 13a and 13b can be operated easily while the teaching operation panel body 10 is held by putting one hand on the left corner portion 30 or the right corner portion 40.

Figure 6:
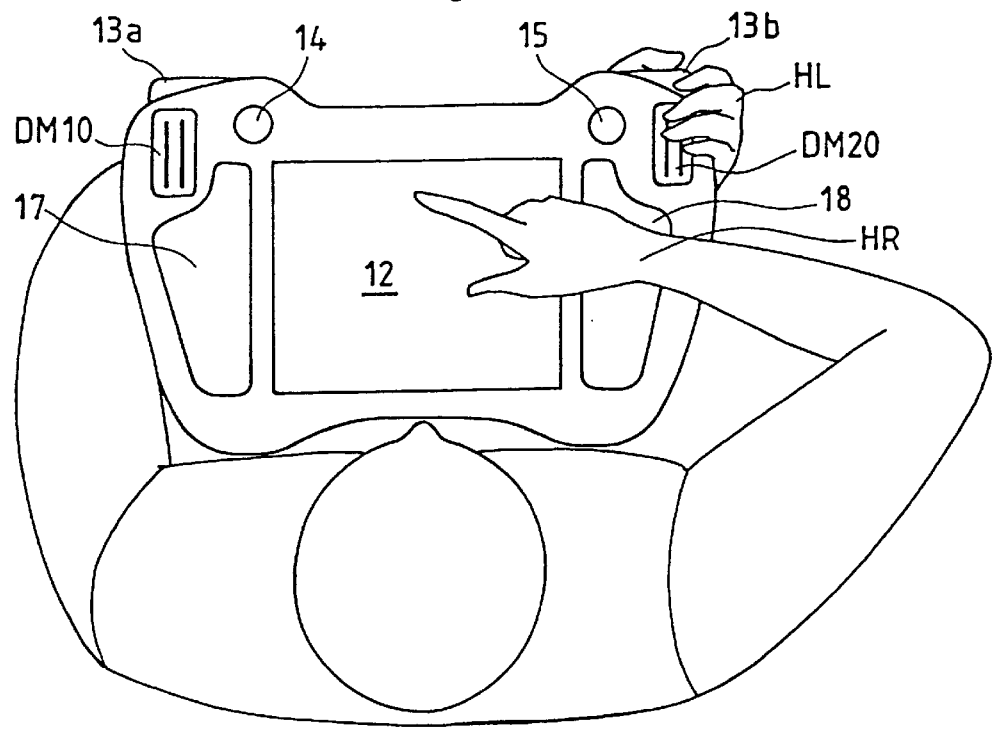
FIG. 6 is a view showing one mode of holding and operation of the teaching operation panel shown in FIGS. 1 to 5.
Figure 7:
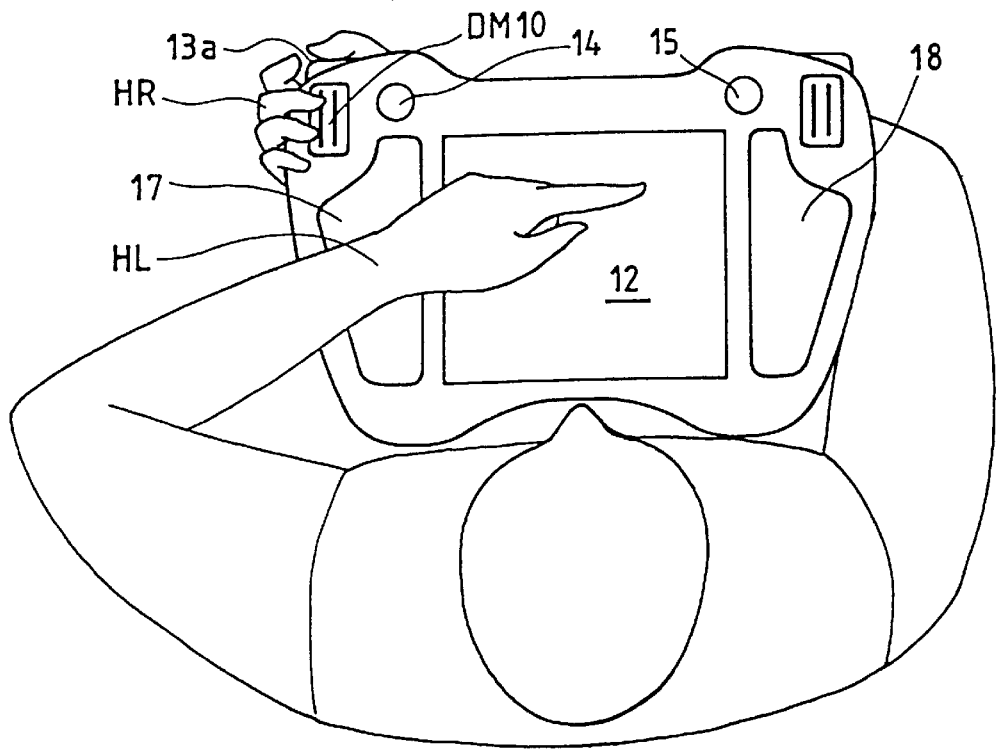
FIG. 7 is a view showing another mode of holding and operation of the teaching operation panel shown in FIGS. 1 to 5.

The mode of holding and operation of the teaching operation panel having the arrangement and construction of this example is as shown in FIG. 6 or 7, for example. In the example shown in FIG. 6, the operator extends his/her left arm from the back side of the teaching operation panel body to the front right corner portion, puts his/her left hand HL on the right corner portion, and applies an energizing force (pressing force) to the deadman switch DM20, for example, with his/her forefinger and middle finger.

As described later, the operation force applied to the deadman switch DM20 (or DM10) is regulated by the operator as "lower than normal operation force (including non-application)", "normal operation force (lower than special operation force)", and "special operation force (exceeding normal operation force)". When the normal operation force lower than the special operation force is applied, the robot is in the ON state.

Contrarily, when an operation force lower than the normal operation force is applied (including non-application) or when the special operation force is applied, the robot is in the OFF state. In appropriate cases, the OFF state corresponding to the former is referred to as a first OFF state, and the OFF state corresponding to the latter is referred to as a second OFF state. If an emergency occurs, the robot can be stopped in emergency by either of the first and second OFF states.

Further, if necessary, an energizing force (pressing force) can be applied to the operation effective switch 13b with the thumb of the same left hand HL. This operation is simple because the operation effective switch 13b is provided so as to be close to the deadman switch DM20. The disengaged right hand HR is used to touch a display (touch panel) or to operate a desired applicator (power ON/OFF switch 14, emergency stop button 15, general control key sections 17 and 18, etc.).

Since the left arm supports the teaching operation panel body by extending diagonally on the back surface of the teaching operation panel body, stable holding can be performed easily by the left arm only.

When the convex portions are provided at the corner portions as in this example, the holding of the corner portion and the operation of both the switches 13b and DM20 are made easier.

Next, in the example shown in FIG. 7, the operator can extend his/her right arm from the back side of the teaching operation panel body to the front left corner portion, put his/her right hand HR on the left corner portion, and applies an energizing force (pressing force) to the deadman switch DM10, for example, with his/her forefinger and middle finger.

Like the example shown in FIG. 6, the applied pressing force is regulated by the operator as three stages (lower than normal operation force/normal operation force/special operation force), and switches the robot to the first OFF state (without application or when an operation force lower than normal operation force is applied), the ON state (when normal operation force is applied), or the second OFF state (when special operation force is applied). In particular, if an emergency occurs, an external operation force is not applied to both of the deadman switches DM10 and DM20, or at least one of the deadman switches DM10 and DM20 (here, DM10) is pressed strongly (application of special operation force), by which the robot is stopped in emergency by making it in the first or second OFF state.

Also, if necessary, an energizing force (pressing force) can be applied to the operation effective switch 13a with the thumb of the same right hand HR. The disengaged left hand HL can be used to touch a display (touch panel) or to operate a desired applicator (power ON/OFF switch 14, emergency stop button 15, general control key sections 17 and 18, etc.).

Since the right arm supports the teaching operation panel body by extending diagonally on the back surface of the teaching operation panel body, stable holding can be performed easily by the right arm only. Also, since the operation effective switch 13a is provided so as to be close to the deadman switch DM10, it is easy to operate the operation effective switch 13a with the same right hand HR while keeping the energizing external force (pressing force) on the deadman switch DM10. Like the example shown in FIG. 6, when the convex portions are provided at the corner portions, the holding of the corner portion and the operation of both the switches 13a and DM10 are made easier.

Hereinafter, six embodiments of an emergency stop switch mechanism for a robot, which can be applied to, for example, the deadman switches DM10 and DM20 provided on the aforementioned teaching operation panel, will be described schematically with reference to FIGS. 8 to 14.

(First embodiment: FIGS. 8a to 8c)

A main lever La, which is provided as an external operation force applicator for a deadman switch mechanism so as to be exposed on the operation surface of a teaching operation panel, is pivotally supported by an axis AX1, together with a first ancillary lever Lb, with an elastic biasing force S1 indicated by the arrow mark. The axis AX1 is provided on columns 10a (for example, two columns) extending from a teaching operation panel body 10 in the form of a publicly known spring biasing pivot mechanism.

In the vicinity of the tip end of the first ancillary lever Lb, a second ancillary lever Lc is pivotally supported by another axis AX2 with an elastic biasing force S2 indicated by the arrow mark. The main lever La is provided with a plunger PL in such a manner that a pressing force can be applied to the second ancillary lever Lc with a left point in FIGS. 8a to 8c with respect to the axis AX2 (opposite to a movable contact element ME) being a point of application.

The elastic biasing force S1 should preferably be designed to have a magnitude of a degree such that the force is not overcome until the operator applies a moderate external operation force (here, a pressing force) to the main lever La. Contrarily, the elastic biasing force S2 is determined so as to sufficiently exceed the elastic biasing force S1. However, if the elastic biasing force S2 is excessively large, the operation becomes difficult to perform. Consequently, the elastic biasing force S2 should preferably designed to have a magnitude of a degree such that the force is not overcome when the operator applies a moderate external operation force (normal external operation force) to the main lever La and the force is overcome when he/she applies a very strong external operation force (special external operation force) to the main lever La.

When the robot operation is started, the operator pushes down the main lever La from the OFF state shown in FIG. 8a with a normal external operation force of a degree such as to slightly exceed the elastic biasing force S1. Accordingly, the plunger PL pushes down the second ancillary lever Lc. Here, since the elastic biasing force S2 is sufficiently larger than the elastic biasing force S1, the axis AX2, connecting the second ancillary lever Lc to the first ancillary lever Lb, substantially keeps the fixed state unless the external operation force is too large.

Thereupon, a movable contact element ME provided on a contact mechanism section CM is moved to the ON position by the second ancillary lever Lc, by which the ON state shown in FIG. 8b is established. That is to say, in this embodiment, the second ancillary lever Lc functions as a working member to perform switching between the ON position for permitting the robot motion and the OFF position for prohibiting it by acting on a switch means.

In this ON state, the robot motion is not prohibited. It is to be noted that the contact mechanism section CM including the movable contact element ME is provided on a column 10b extending from the teaching operation panel body 10 in a publicly known manner. The contact mechanism section CM functions as the switch means such that the movable contact element ME takes the ON position for permitting the robot motion and the OFF position for stopping the robot motion. The movable contact element ME normally takes the OFF position; it is biased toward the OFF position (upward projecting position) by a publicly known proper biasing mechanism (not shown) and a stopper mechanism. This arrangement is the same in the later-described second to seventh embodiments as well.

If an emergency stop of robot becomes necessary during the robot operation, (1) the pressure of the main lever La is released, or (2) the main lever La is pushed down with a very strong external operation force (special external operation force) from the ON state shown in FIG. 8b.

When the action (1) is selected, the movable contact element ME is returned to the OFF position by the action similar to that of the conventional two-position type deadman switch, whereby the robot can be stopped in emergency. Specifically, if the pressure of the main lever La is released, the main and ancillary levers La, Lb and Lc are returned to a neutral position shown in FIG. 8a (or a position regulated by a stopper) by the elastic biasing force S1.

Contrarily, when the action (2) is selected, a case of the contact mechanism CM or the extension 10b, the teaching operation panel body 10, or the like functions as a stopper for the first ancillary lever Lb. As a result, a torque overcoming the elastic biasing force S2 is applied to the axis AX2 connecting the second ancillary lever Lc to the first ancillary lever Lb, so that the second ancillary lever Lc is pushed down as shown in FIG. 8c.

Such a state change is clearly perceived by the operator. The energizing force on the movable contact element ME applied by the second ancillary lever Lc is lost, so that the OFF state is established, thereby stopping the robot immediately.

(Second embodiment: FIGS. 9a to 9c)

A main lever La, which is provided as an external operation force applicator for a deadman switch mechanism so as to be exposed on the operation surface of a teaching operation panel, is pivotally supported by an axis AX1, together with a first ancillary lever Lb, with an elastic biasing force S1 indicated by the arrow mark. The axis AX1 is provided on columns 10a (for example, two columns) extending from a teaching operation panel body 10 in the form of a publicly known spring biasing pivot mechanism.

In the vicinity of the tip end of the first ancillary lever Lb, a second ancillary lever Lc is pivotally supported by another axis AX2 with an elastic biasing force S2 indicated by the arrow mark. The main lever La is provided with a plunger PL in such a manner that a pressing force can be applied to the first ancillary lever Lc with a point near the axis AX2 being a point of application.

The elastic biasing force S1 should preferably be designed to have a magnitude of a degree such that the force is not overcome until the operator applies a moderate external operation force (here, a pressing force) to the main lever La. Contrarily, the elastic biasing force S2 is determined so as to sufficiently exceed the elastic biasing force S1. However, if the elastic biasing force S2 is excessively large, the operation becomes difficult to perform. Consequently, the elastic biasing force S2 should preferably be designed to have a magnitude of a degree such that the force is not overcome when the operator applies a moderate external operation force (normal external operation force) to the main lever La and the force is overcome when he/she applies a very strong external operation force (special external operation force) to the main lever La.

When the robot operation is started, the operator pushes down the main lever La from the OFF state shown in FIG. 9a with a normal external operation force of a degree such as to slightly exceed the elastic biasing force S1. Accordingly, the plunger PL pushes down the first ancillary lever Lb. Here, since the elastic biasing force S2 is sufficiently larger than the elastic biasing force S1, the axis AX2, connecting the second ancillary lever Lc to the first ancillary lever Lb, substantially keeps the fixed state unless the external operation force is too large.

Thereupon, a movable contact element ME provided on a contact mechanism section CM is moved to the ON position by the second ancillary lever Lc, by which the ON state shown in FIG. 9b is established. That is to say, in this embodiment as well, the second ancillary lever Lc functions as a working member to perform switching between the ON position for permitting the robot motion and the OFF position for prohibiting it by acting on a switch means. In this ON state, the robot motion is not prohibited.

If an emergency stop of robot becomes necessary during the robot operation, (1) the pressure of the main lever La is released, or (2) the main lever La is pushed down with a very strong external operation force (special external operation force) from the ON state shown in FIG. 9b.

When the action (1) is selected, the movable contact element ME is returned to the OFF position by the action similar to that of the conventional two-position type deadman switch, whereby the robot can be stopped in emergency. Specifically, if the pressure of the main lever La is released, the main and ancillary levers La, Lb and Lc are returned to a neutral position shown in FIG. 9a (or a position regulated by a stopper) by the elastic biasing force S1.

Contrarily, when the action (2) is selected, a case of the contact mechanism CM, the top of the extension 10b of the teaching operation panel body 10, or the like functions as a stopper for the second ancillary lever Lc. As a result, a torque overcoming the elastic biasing force S2 is applied to the axis AX2 corresponding to the articulate axis connecting the second ancillary lever Lc to the first ancillary lever Lb, so that the first ancillary lever Lb and the second ancillary lever Lc are bent as shown in FIG. 9c . Such a state change is clearly perceived by the operator. The energizing force on the movable contact element ME applied by the second ancillary lever Lc is lost, so that the OFF state is established, thereby stopping the robot immediately.

(Third embodiment: FIGS. 10a to 10c)

A main lever La, which is provided as an external operation force applicator for a deadman switch mechanism so as to be exposed on the operation surface of a teaching operation panel, is pivotally supported by an axis AX1, together with a first ancillary lever Lb, with an elastic biasing force S1 indicated by the arrow mark. The axis AX1 is provided on a column 10a extending from a teaching operation panel body 10 in the form of a publicly known spring biasing pivot mechanism.

In the vicinity of the tip end of the first ancillary lever Lb, a second ancillary lever Lb is pivotally supported by another axis AX2 with an elastic biasing force S2 indicated by the arrow mark. Also, in the vicinity of the other end of the second ancillary lever Lc, one end of a link LK is pivotally supported by an axis AX3. In the vicinity of the tip end of the main lever La, the other end of the link LK is pivotally supported by an axis AX4.

The elastic biasing force S1 should preferably be designed to have a magnitude of a degree such that the force is not overcome until the operator applies a moderate external operation force (here, a pressing force) to the main lever La. Contrarily, the elastic biasing force S2 is determined so as to sufficiently exceed the elastic biasing force S1. However, if the elastic biasing force S2 is excessively large, the operation becomes difficult to perform. Consequently, the elastic biasing force S2 should preferably be designed to have a magnitude of a degree such that the force is not overcome when the operator applies a moderate external operation force (normal external operation force) to the main lever La and the force is overcome when he/she applies a very strong external operation force (special external operation force) to the main lever La.

When the robot operation is started, the operator pushes down the main lever La from the OFF state shown in FIG. 10a with a normal external operation force of a degree such as to slightly exceed the elastic biasing force S1. Accordingly, the second ancillary lever Lc is pushed down via the link LK.

Here, since the elastic biasing force S2 is sufficiently larger than the elastic biasing force S1, the axis AX2, connecting the second ancillary lever Lc to the first ancillary lever Lb, substantially keeps the fixed state unless the external operation force is too large.

On the other hand, a contact mechanism section CM is provided at a position corresponding to the second ancillary lever Lb relatively near the AX3 by using an extension 10a, so that a movable contact element ME is moved to the ON position by the second ancillary lever Lc, by which the ON state shown in FIG. 10b is established. That is to say, in this embodiment as well, the second ancillary lever Lc functions as "a working member to perform switching between the ON position for permitting the robot motion and the OFF position for prohibiting it by acting on a contact mechanism". In this ON state, the robot motion is not prohibited.

If an emergency stop of robot becomes necessary during the robot operation, (1) the pressure of the main lever La is released, or (2) the main lever La is pushed down with a very strong external operation force (special external operation force) from the ON state shown in FIG. 10b.

When the action (1) is selected, the main and ancillary levers La, Lb and Lc are returned to a neutral position shown in FIG. 10a (or a position regulated by a stopper) by the elastic biasing force S1.

Contrarily, when the action (2) is selected, there acts a force to further raise the axis AX3 side of the second ancillary lever Lc via the link LK. Here, since the turning of the tip end of the first ancillary lever Lc is regulated by a stopper 10c provided at the tip end of an extension 10b of the teaching operation panel body 10, the elastic biasing force S2 is overcome, and therefore the posture relationship of the first and second ancillary levers Lb and Lc is changed. Specifically, only the second ancillary lever Lc is turned upward around the axis AX2, by which the state shown in FIG. 10c is established. Such a state change is clearly perceived by the operator. The energizing force on the movable contact element ME applied by the second ancillary lever Lc is lost, so that the OFF state is established, thereby stopping the robot immediately.

(Fourth embodiment: FIGS. 11a to 11c)

A main lever La, which is provided as an external operation force applicator for a deadman switch mechanism so as to be exposed on the operation surface of a teaching operation panel, is pivotally supported by an axis AX1, together with an ancillary lever Lb and a block BL, with an elastic biasing force S1 indicated by the arrow mark. The axis AX1 is provided on a column 10a extending from a teaching operation panel body 10 in the form of a publicly known spring biasing pivot mechanism.

In the vicinity of the ancillary lever Lb, an axis AX2 is provided, by which one end of a link LK1 is pivotally supported. The other end of the link LK1 is fixed to a support SP. The support SP is elastically connected to the block BL, and one end of another link LK2 is fixed to the support SP. The other end of the link LK2 is pivotally supported by an axis AX3 provided in the vicinity of the tip end of the main lever La.

The elastic biasing force S1 should preferably be designed to have a magnitude of a degree such that the force is not overcome until the operator applies a moderate external operation force (here, a pressing force) to the main lever La. Contrarily, the elastic biasing force S2 is determined so as to sufficiently exceed the elastic biasing force S1. However, if the elastic biasing force S2 is excessively large, the operation becomes difficult to perform. Consequently, the elastic biasing force S2 should preferably be designed to have a magnitude of a degree such that the force is not overcome when the operator applies a moderate external operation force (normal external operation force) to the main lever La and the force is overcome when he/she applies a very strong external operation force (special external operation force) to the main lever La.

When the robot operation is started, the operator pushes down the main lever La from the OFF state shown in FIG. 11a with a normal external operation force of a degree such as to slightly exceed the elastic biasing force S1. Accordingly, the support SP is pushed down via the link LK2.

Here, since the elastic biasing force S2 is sufficiently larger than the elastic biasing force S1, a state in which the relative positional relationship between the support SP and the block BL is substantially fixed is kept unless the external operation force is too large.

Thereupon, the block BL and the ancillary lever Lb are turned downward in an integrated manner, so that a movable contact element ME of a contact mechanism CM provided on an extension 10b is moved to the ON position by the ancillary lever Lb, by which the ON state shown in FIG. 11b is established. That is to say, in this embodiment, the ancillary lever Lb functions as "a working member to perform switching between the ON position for permitting the robot motion and the OFF position for prohibiting it by acting on a contact mechanism". In this ON state, the robot motion is not prohibited.

If an emergency stop of robot becomes necessary during the robot operation, (1) the pressure of the main lever La is released, or (2) the main lever La is pushed down with a very strong external operation force (special external operation force) from the ON state shown in FIG. 11b.

When the action (1) is selected, the main and ancillary levers La and Lb are returned to a neutral position shown in FIG. 11a (or a position regulated by a stopper) by the elastic biasing force S1.

Contrarily, when the action (2) is selected, a force to raise the tip end of the ancillary lever Lb via the links LK1 and LK2 acts, so that the state shown in FIG. 11c is established.

Such a state change is clearly perceived by the operator. The energizing force on the movable contact element ME applied by the ancillary lever Lb is lost, so that the OFF state is established, thereby stopping the robot immediately.

(Fifth embodiment: FIGS. 12a to 12c)

A main lever La, which is provided as an external operation force applicator for a deadman switch mechanism so as to be exposed on the operation surface of a teaching operation panel, is pivotally supported by an axis AX1 with an elastic biasing force S1 indicated by the arrow mark.

In the vicinity of an ancillary lever Lb, an axis AX2 is provided, by which one end of a link LK1 is pivotally supported. The other end of the link LK1 is fixed to a spring-loaded support SS. The spring-loaded support SS is connected to the link LK1, and one end of another link LK2 is fixed to the spring-loaded support SS. The other end of the link LK2 is pivotally supported by an axis AX3 provided in the vicinity of the tip end of the main lever La.

The axis AX1 is provided on a column 10a extending from a teaching operation panel body 10 in the form of a publicly known spring biasing pivot mechanism. Also, an extension 10b of the teaching control body 10 is provided with a stopper 10c for regulating the downward turning of the spring-loaded support SS, together with a contact mechanism CM having a movable contact member ME.

The elastic biasing force S1 should preferably be designed to have a magnitude of a degree such that the force is not overcome until the operator applies a moderate external operation force (here, a pressing force) to the main lever La. Contrarily, the elastic biasing force S2 of the spring-loaded support SS is determined so as to sufficiently exceed the elastic biasing force S1. However, the elastic biasing force S2 is designed to have a magnitude of a degree such that the force is overcome when a very strong external operation force (special external operation force) is applied to the main lever La.

Here, the spring-loaded support SS takes a neutral shape (an angle between the links LK1 and LK2) when it is in the state shown in FIG. 12a. The elastic biasing force S2 is a biasing force to inhibit a change in angle between the links LK1 and LK2 from the neutral state in the increasing or decreasing direction.

When the robot operation is started, the operator pushes down the main lever La from the OFF state shown in FIG. 12a with a normal external operation force of a degree such as to slightly exceed the elastic biasing force S1. Accordingly, the spring-loaded support SS is pushed down via the link LK2.

Here, since the elastic biasing force S2 is sufficiently larger than the elastic biasing force S1, a state in which the angle between the links LK1 and LK2 is substantially fixed is kept unless the external operation force is too large.

Thereupon, the spring-loaded support SS and the ancillary lever Lb are turned downward in an integrated manner, so that the movable contact element ME of the contact mechanism CM provided on the extension 10b is moved to the ON position by the ancillary lever Lb, by which the ON state shown in FIG. 12b is established. That is to say, in this embodiment, the ancillary lever Lb functions as "a working member to perform switching between the ON position for permitting the robot motion and the OFF position for prohibiting it by acting on a contact mechanism". In this ON state, the robot motion is not prohibited.

If an emergency stop of robot becomes necessary during the robot operation, (1) the pressure of the main lever La is released, or (2) the main lever La is pushed down with a very strong external operation force (special external operation force) from the ON state shown in FIG. 12b.

When the action (1) is selected, the main and ancillary levers La and Lb are returned to a neutral position shown in FIG. 12a (or a position regulated by a stopper) by the elastic biasing force S1.

Contrarily, when the action (2) is selected, a force to further push down the spring-loaded support SS and the ancillary lever Lb acts. However, since the turning of the tip end of the spring-loaded support SS is regulated by the stopper 10c provided at the tip end of the extension 10b of the teaching operation panel body 10, the elastic biasing force S2 is overcome, so that the angle between the links LK1 and LK2 is decreased.

As a result, the ancillary lever Lb is turned upward inversely, by which the state shown in FIG. 12c is established. Such a state change is clearly perceived by the operator. The energizing force on the movable contact element ME applied by the ancillary lever Lb is lost, so that the OFF state is established, thereby stopping the robot immediately.

(Sixth embodiment: FIGS. 13a to 13c)

A main lever La, which is provided as an external operation force applicator for a deadman switch mechanism so as to be exposed on the operation surface of a teaching operation panel, is pivotally supported by an axis AX1, together with an ancillary lever Lb, with an elastic biasing force S1 indicated by the arrow mark.

On a point near the tip end of the ancillary lever Lb, one end of an L-shaped support SL abuts. The other end of the L-shaped support SL is pivotally supported by an axis AX2 provided on the main lever La with an elastic biasing force S2.

The axis AX1 is provided on a column 10a extending from a teaching operation panel body 10 in the form of a publicly known spring biasing pivot mechanism. Also, an extension 10b of the teaching control body 10 is provided with a stopper 10c for regulating the downward turning of the main lever La, together with a contact mechanism CM having a movable contact member ME.

The elastic biasing force S1 should preferably be designed to have a magnitude of a degree such that the force is not overcome until the operator applies a moderate external operation force (here, a pressing force) to the main lever La. Contrarily, the elastic biasing force S2 of the L-shaped support SL is determined so as to sufficiently exceed the elastic biasing force S1. However, the elastic biasing force S2 is designed to have a magnitude of a degree such that the force is overcome when a very strong external operation force (special external operation force) is applied to the main lever La.

Here, the L-shaped support SL takes a neutral state (relative posture with respect to the main lever La) when it is in the state shown in FIG. 13a. The elastic biasing force S2 is a biasing force to inhibit a bidirectional change in the relative posture of the L-shaped support SL with respect to the main lever La.

When the robot operation is started, the operator pushes down the main lever La from the OFF state shown in FIG. 13a with a normal external operation force of a degree such as to slightly exceed the elastic biasing force S1. Accordingly, the ancillary lever Lb is pushed down via the L-shaped support SL.

Here, since the elastic biasing force S2 is sufficiently larger than the elastic biasing force S1, a state in which the relative posture of the L-shaped support SL with respect to the main lever La is substantially fixed is kept unless the external operation force is too large.

Thereupon, the L-shaped support SL and the ancillary lever Lb are turned downward, so that the movable contact element ME of the contact mechanism CM provided on the extension 10b is moved to the ON position by the ancillary lever Lb, by which the ON state shown in FIG. 13b is established. That is to say, in this embodiment, the ancillary lever Lb functions as "a working member to perform switching between the ON position for permitting the robot motion and the OFF position for prohibiting it by acting on a contact mechanism". In this ON state, the robot motion is not prohibited.

If an emergency stop of robot becomes necessary during the robot operation, (1) the pressure of the main lever La is released, or (2) the main lever La is pushed down with a very strong external operation force (special external operation force) from the ON state shown in FIG. 13b.

When the action (1) is selected, the main and ancillary levers La and Lb are returned to a neutral position shown in FIG. 13a (or a position regulated by a stopper) by the elastic biasing force S1.

Contrarily, when the action (2) is selected, a force to further push down the L-shaped support SL and the ancillary lever Lb acts. However, since the turning of the tip end of the L-shaped support SL is regulated by the stopper 10c provided at the tip end of the extension 10b of the teaching operation panel body 10, the relative posture of the L-shaped support SL with respect to the main lever La is changed by overcoming the elastic biasing force S2, so that the ancillary lever Lb is turned upward from the tip end inversely, by which the state shown in FIG. 13c is established. Such a state change is clearly perceived by the operator. The energizing force on the movable contact element ME applied by the ancillary lever Lb is lost, so that the OFF state is established, thereby stopping the robot immediately.

Although the above six embodiments have been explained, the present invention is not limited to these embodiments, and any modification can be made as long as the requirements described in the claims are met.

Figure 16A:
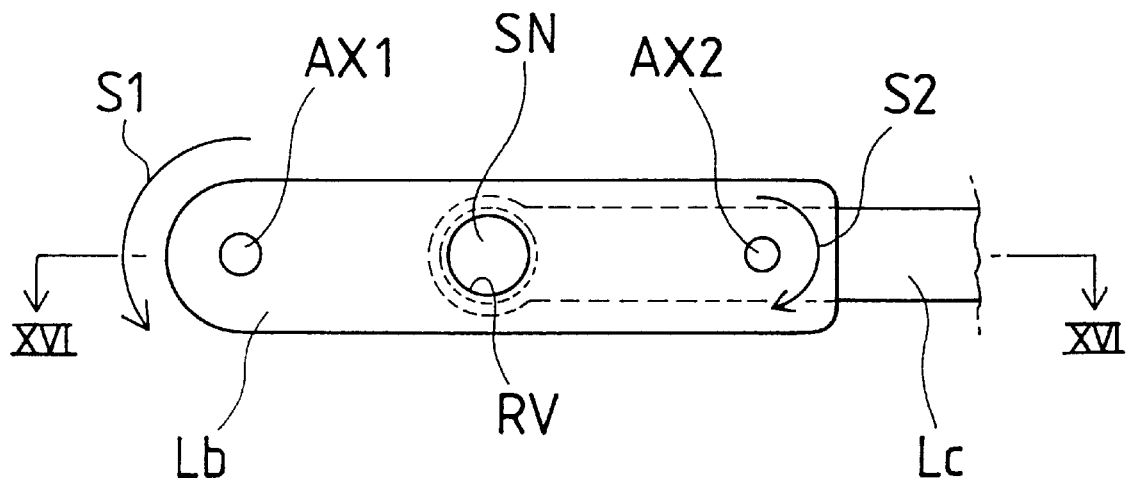
FIGS. 16a and 16b are views showing an outline of a snap mechanism which can be added to the first embodiment (FIGS. 8a to 8b) or the second embodiment (FIGS. 9a to 9b)
Figure 16B:
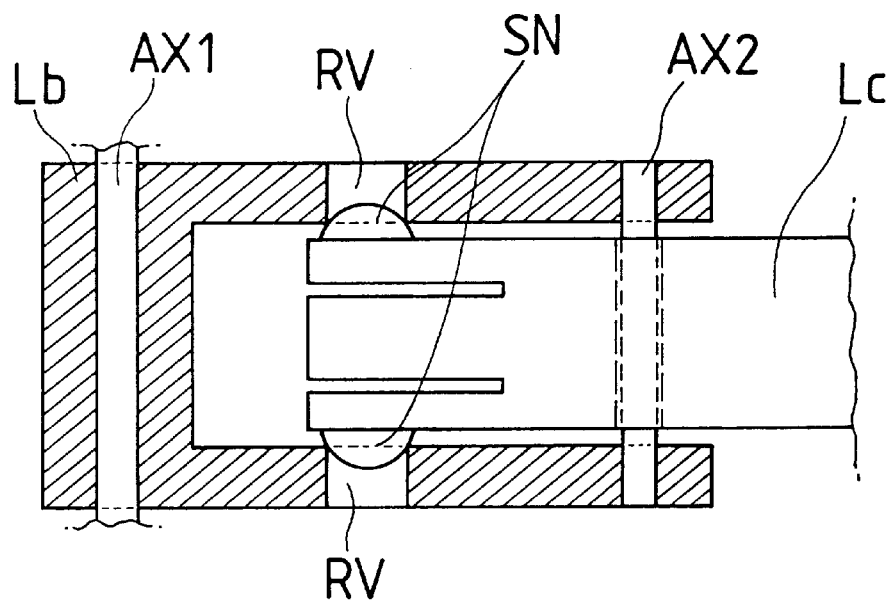

For example, an elastic mechanism (pivotally supported mechanism with the elastic biasing force S2) is provided between the applicator (main lever La) and the working member (ancillary lever Lc) for the movable contact element ME, by which the elastic biasing force S2 of the elastic mechanism may be supplemented. FIGS. 16a and 16b are a side sectional view and a sectional view, respectively, showing the outline of a snap mechanism which can be added to the aforementioned first embodiment (FIGS. 8a to 8c) or second embodiment (FIGS. 9a to 9c).

As shown in FIGS. 16a and 16b, the ancillary lever Lb is pivotally supported by the axis AX1 with the elastic biasing force S1, and the ancillary lever Lc is pivotally supported by the axis AX2 provided on the ancillary lever Lb. On such an elastic mechanism, snaps SN are provided near the base of the ancillary lever Lc, and on the other hand, snap receiving portions RV for elastically receiving the snaps SN are provided at the corresponding positions of the ancillary lever Lb.

By additionally installing such a snap mechanism (SN, RV) to the elastic mechanism, a motion such that the snap SN comes off from the receiving portion RV (displacement of snap mechanism) is created at the time of switching from the ON state to the second OFF state. This displacement of the snap mechanism performs the function of supplementing the elastic biasing force S2, so that the distinction between the ON state and the second OFF state is made clear.

Figure 17C:
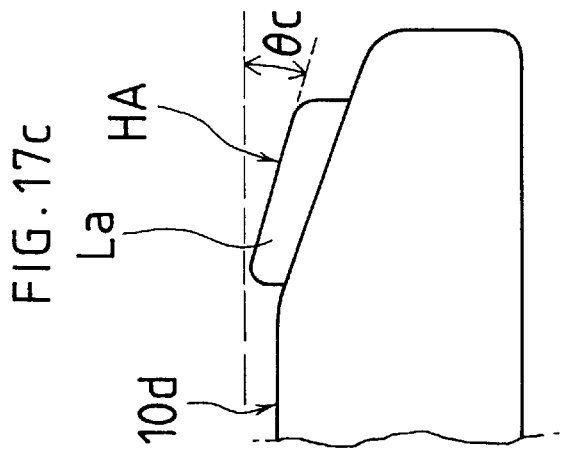
FIGS. 17a to 17c are views showing postures of an exposed portion (operation surface HA) of a main lever La in a first OFF state, ON state, and a second OFF state.
Figure 17B:
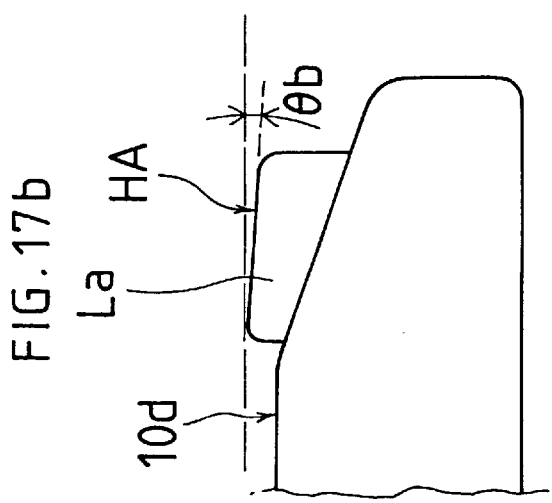
Figure 17A:
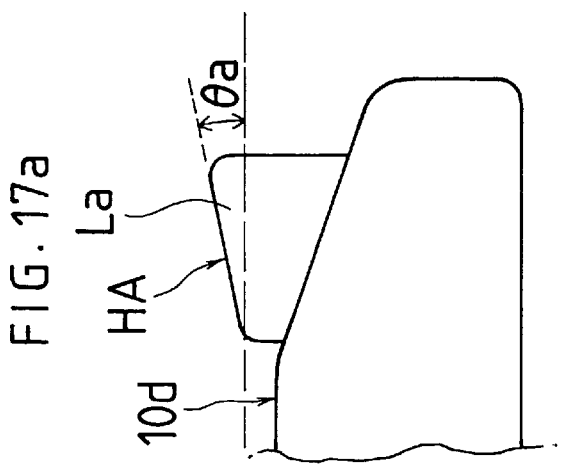

Also, in both of the aforementioned embodiments, the posture of the external exposed surface (operation surface HA) can be made a posture in parallel to or approximately in parallel to the surface of the teaching operation panel body 10. FIGS. 17a to 17c show the postures of the exposed portion (operation surface HA) of the main lever La in the first OFF state, the ON state, and the second OFF state, respectively.

In these figures, θa, θb and θc represent an angle of the operation surface HA of the main lever La with respect to an external surface 10d of the teaching operation panel body 10d (around the exposed portion of the main lever La) in the first OFF state, the ON state, and the second OFF state, respectively. Of these angles, θb is smaller than the other angle θa or θc, preferably θb=about 0°. Thus, by making the posture of the operation surface HA in the ON state a posture in parallel to or approximately in parallel to the surface of the teaching operation panel body 10, the operator's burden for keeping the ON state during the robot operation is decreased. Also, the transfer to the second OFF state in emergency is perceived as a pressing operation such that the operation surface HA is pushed down from the surface 10d of the teaching operation panel body 10. Such a pressing operation is easily perceived by the operator, and is reasonable as an operation in emergency.

The present invention uses a mechanism in which the members such as the main lever La and the ancillary levers Lb and Lc are pivotally supported with an elastic biasing force. The mechanism of this type is not described in detail because it is known as an ordinary mechanism, and as an example, a mechanism in which the main lever La and the ancillary lever Lb are pivotally supported by the extensions 10a of the teaching operation panel body 10 is shown in FIG. 14.

Figure 14:
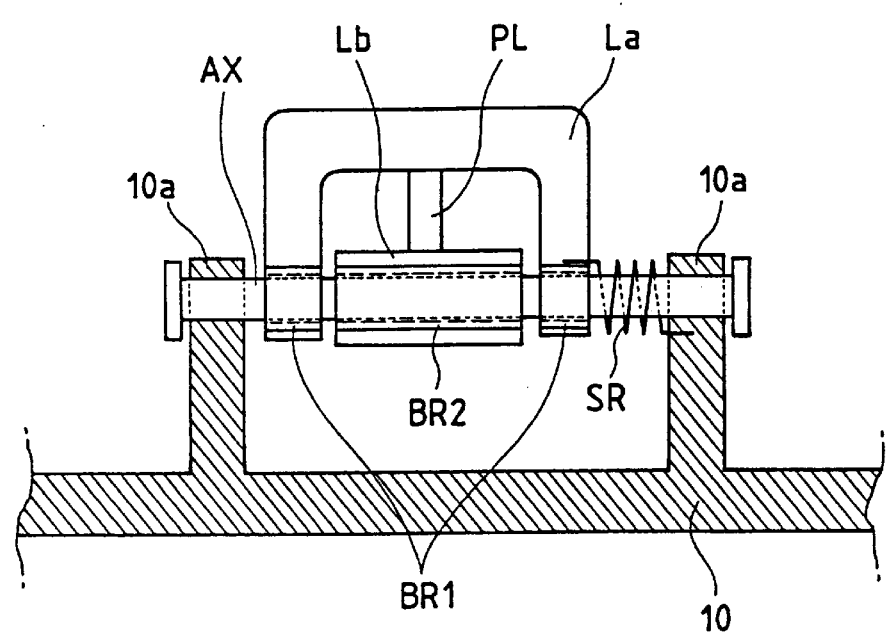
FIG. 14 is a view showing one example of a mechanism for pivotally supporting a main lever or an ancillary lever with an elastic biasing force.
Figure 15A:
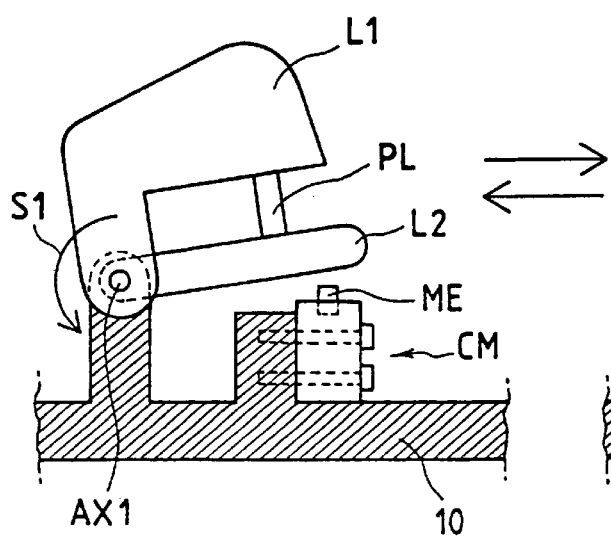
FIG. 15a shows a state in which an external operation force is not applied.
Figure 15B:
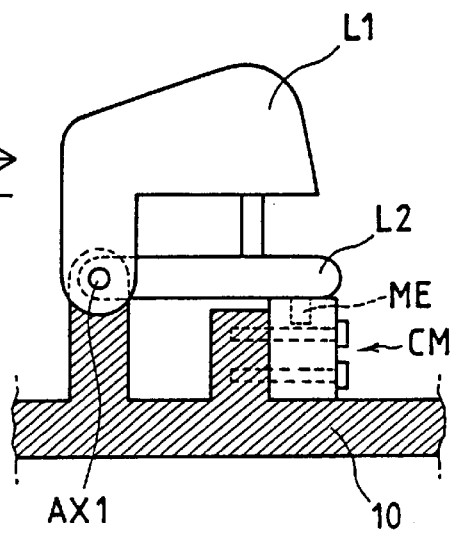
FIG. 15b shows a state in which an external operation force is applied.

In FIG. 14, reference character AX denotes a fixed shaft extending between the two extensions 10a. The main lever La and the ancillary lever Lb are fitted to and supported by the fixed shaft AX via bearings BR1 and BR2, respectively. Reference character PL denotes a plunger which is attached to the main lever La, and the tip end of which abuts on the ancillary lever Lb. One end of a coil spring SR wound around the shaft AX is fixed to the main lever La, and the other end thereof is fixed to the extension 10a.

Also, the aforementioned working member is not limited to the aforementioned lever. As an example, an emergency switch mechanism in which the emergency switch mechanism of the first embodiment is modified, and a pushbutton is used as the working member in place of the lever is shown in FIGS. 18a to 18c.

(Seventh embodiment: FIGS. 18a to 10c)

Referring to FIGS. 18a to 18c, on the bottom surface on the inside of the teaching operation panel body 10, a pushbutton installation section is provided by using a column 10b and a stopper portion 10c formed by raising the bottom portion of the column 10b. In the column 10b, a slider Lb is elastically inserted together with a main lever La with an elastic biasing force S1. In the vicinity of the end of the slider Lb, an ancillary lever Lc is pivotally supported with an elastic biasing force S2 in an elastic manner.

The main lever La is provided with a plunger PL so as to be capable of applying a pressing force with the vicinity of tip end of the ancillary lever Lc being a point of application. The elastic biasing force S1 should preferably be designed to have a magnitude of a degree such that the force is not overcome until the operator applies a moderate external operation force (a pressing force) to the pushbutton La. Contrarily, the elastic biasing force S2 should preferably be designed to have a magnitude of a degree such that the force is not overcome when the operator applies a moderate external operation force (normal external operation force) to the pushbutton La and the force is overcome when he/she applies a very strong external operation force (special external operation force) to the pushbutton La.

When the robot operation is started, the operator pushes down the pushbutton La from the OFF state shown in FIG. 18a with a normal external operation force of a degree such as to slightly exceed the elastic biasing force S1. Accordingly, the plunger PL pushes down the ancillary lever Lc. Here, since the elastic biasing force S2 is sufficiently larger than the elastic biasing force S1, the slider Lb and the ancillary lever Lc are pushed down while being substantially fixed unless the external operation force is too large.

As a result, a movable contact element ME provided on a contact mechanism section CM is pushed down by the ancillary lever Lc, by which the ON state shown in FIG. 18b is established. In this ON state, the robot motion is not prohibited. The contact mechanism section CM including the movable contact element ME is provided on the outside of the column 10b extending from the teaching operation panel body 10 in a publicly known manner. The movable contact element ME is the same as that used in the first and other embodiments.

If an emergency stop of robot becomes necessary during the robot operation, (1) the pressure of the pushbutton La is released, or (2) the pushbutton La is pushed down with a very strong external operation force (special external operation force) from the ON state shown in FIG. 18b.

When the action (1) is selected, the movable contact element ME is returned to the OFF position by the action similar to that of the conventional two-position type deadman switch, whereby the robot can be stopped in emergency. Specifically, if the pressure of the pushbutton La is released, the pushbutton La, the slider Lb, and the ancillary lever Lc are returned to a neutral position shown in FIG. 18a (or a position regulated by a stopper) by the elastic biasing force S1.

Contrarily, when the action (2) is selected, the stopper portion 10c functions to stop the slider Lb, and the ancillary lever Lc is turned by being subjected to a torque overcoming the elastic biasing force S2. Such a state change is clearly perceived by the operator as the dropping of the pushbutton La. The energizing force on the movable contact element ME applied by the lever Lc is lost, so that the OFF state is established, thereby stopping the robot immediately.

According to the present invention, if an emergency stop of robot becomes necessary during the robot operation, the emergency stop can be achieved by either of the action of releasing the external operation force on the applicator such as an external lever and the action of increasing the external operation force by using a simple mechanism. Also, when the emergency stop of robot is achieved by a strong external operation force, the operator can perceive the achievement with a definite feeling. Also, according to the present invention, by providing such a robot emergency stop mechanism at an appropriate position on the teaching operation panel, there can be provided a teaching operation panel which has a high operating property and can easily secure the operator's safety.

What is claimed is:

1. An emergency stop mechanism for a robot, comprising:
   switch means which takes an ON position for permitting a robot motion and an OFF position for stopping the robot motion;
   an operative member which acts on said switch means for switching between the ON and OFF positions;
   an external-operation-force receiving member elastically supported with a first biasing force, for receiving an external operation force; and connecting means for elastically connecting said operative member to said external-operation-force receiving member with a second biasing force larger than said first biasing force, wherein said connecting means substantially maintains a relative position of said external-operation-force receiving member and said operative member so that said external operation force acts on said switch means so as to be switched from the OFF position to the ON position when a normal operation force larger than said first biasing force but not larger than said second biasing force is applied to said external-operation-force receiving member, and said connecting means changes the relative position of said external-operation-force receiving member and said operative member so that said external operation force does not act on said switch means so as to be switched from the ON position to the OFF position when a special operation force exceeding said second biasing force is applied to said external-operation-force receiving member.

2. An emergency stop switch mechanism for a robot according to claim 1, wherein said connecting means comprises a lever having one end pivotally supported and an other end pivotally supporting said operative member, and an elastic member for providing said second biasing force to said operative member.

3. An emergency stop switch mechanism for a robot according to claim 1, wherein said operative member comprises a pivotally supported lever having one end contactable with said switch means, and said connecting means comprises an elastic member for providing said second biasing force to said one end of said operative member.

4. An emergency stop switch mechanism for a robot according to claim 1, wherein said connecting means comprises a snap mechanism for assisting said second biasing force, and said snap mechanism is displaced when the special operation force exceeding said second biasing force is applied to said external-operation-force receiving member.

5. A teaching operation panel having an emergency stop switch mechanism for a robot, wherein said emergency stop switch mechanism comprises: switch means which takes an ON position for permitting a robot motion and an OFF position for stopping the robot motion; an operative member which acts on said switch means for switching between the ON and OFF positions; an external-operation-force receiving member elastically supported with a first biasing force, for receiving an external operation force; and connecting means for elastically connecting said operative member to said external-operation-force receiving member with a second biasing force larger than said first biasing force, and wherein said connecting means substantially maintains a relative position of said external-operation-force receiving member and said operative member so that said external operation force acts on said switch means so as to be switched from the OFF position to the ON position when a normal operation force larger than said first biasing force but not larger than said second biasing force is applied to said external-operation-force receiving member, and said connecting means changes the relative position of said external-operation-force receiving member and said operative member so that said external operation force does not act on said switch means so as to be switched from the ON position to the OFF position when a special operation force exceeding said second biasing force is applied to said external-operation-force receiving member.

6. A teaching operation panel according to claim 5, wherein said connecting means comprises a lever having one end pivotally supported and an other end pivotally supporting said operative member, and an elastic member for providing said second biasing force to said operative member.

7. The teaching operation panel according to claim 5, wherein said operative member comprises a pivotally supported lever having one end contactable with said switch means, and said connecting means comprises an elastic member for providing said second biasing force to said one end of said operative member.

8. A teaching operation panel according to claim 5, wherein said connecting means comprises a snap mechanism for assisting said second biasing force, and said snap mechanism is displaced when the special operation force exceeding said second biasing force is applied to said external-operation-force receiving member.

9. A teaching operation panel according to claim 5, wherein said external-operation-force receiving member has an external-operation-force application surface which takes a posture substantially parallel to an outer surface of said teaching operation panel when the normal operation force larger than said first biasing force but not larger than said second biasing force is applied to said external-operation-force receiving member.

10. A teaching operation panel according to claim 5 wherein said emergency stop switch mechanism is provided at both of right and left portions of the teaching operation panel.

* * * * *

UNITED STATES PATENT AND TRADEMARK OFFICE
CERTIFICATE OF CORRECTION

PATENT NO. : 6,180,898 B1
DATED : January 30, 2001
INVENTOR(S) : Akihiro Terada, et al.

It is certified that error appears in the above-identified patent and that said Letters Patent is hereby corrected as shown below:

Title page,
Item 54, change "Emergency Stop Switching Mechanism for Robot and Teaching Control Panel Provided with Same" to -- Emergency Stop Switch Mechanism For a Robot and Teaching Operation Panel Provided with the Mechanism --.

Title page,
Item 75, delete [-gun]; and change "Oshino-mura" to -- Minamitsuru --.

Column 1,
Lines 1-3, change "Emergency Stop Switching Mechanism for Robot and Teaching Control Panel Provided with Same" to -- Emergency Stop Switch Mechanism For a Robot and Teaching Operation Panel Provided with the Mechanism --.

Signed and Sealed this

Twenty-fifth Day of September, 2001

Attest:

*Attesting Officer*

NICHOLAS P. GODICI
*Acting Director of the United States Patent and Trademark Office*